April 27, 1965 A. SIMON 3,181,047
REMOTE MOTOR CONTROL SYSTEM
Filed Nov. 30, 1960 2 Sheets-Sheet 1

INVENTOR.
ANDREW SIMON
BY
WATTS, EDGERTON, PYLE & FISHER
B. D. Watts
ATTORNEYS

April 27, 1965 A. SIMON 3,181,047

REMOTE MOTOR CONTROL SYSTEM

Filed Nov. 30, 1960

INVENTOR.
ANDREW SIMON

BY
WATTS, EDGERTON, PYLE & FISHER
A. D. Watts
ATTORNEYS

United States Patent Office 3,181,047
Patented Apr. 27, 1965

3,181,047

REMOTE MOTOR CONTROL SYSTEM

Andrew Simon, Cleveland, Ohio, assignor to The American Monorail Co., Cleveland, Ohio, a corporation of Ohio Filed Nov. 30, 1960, Ser. No. 72,595
9 Claims. (Cl. 318—202)

This invention relates generally to control systems for poly-phase alternating current motors and is especially concerned with a simple motor control system including a switch by means of which the forward and reverse movements of the motor may be remotely controlled through a single bar and the power and control circuits may be completely deenergized.

In push button control of the movement of a motor, for example, one which propels a bridge crane, it is desirable that the motor and control should be completely deenergized before it is reenergized for movement of the crane in the opposite direction. There are numerous other instances where such control of the motor is highly desirable but the foregoing example will suffice to illustrate the problem.

Heretofore, various systems have been proposed for remotely controlling a reversible motor but none has been entirely satisfactory, so far as I am aware. While each of these proposals seemed to solve the problem, none was completely free from the inherent possibility of the control being still energized when the motor was not in use.

The present invention aims to solve this problem and accomplishes that object by a combination of elements which is new, is not obvious and possesses great utility.

The present invention will be better understood by those skilled in the art from the following specification and the accompanying drawings referred to therein, in which.

Figure 1:
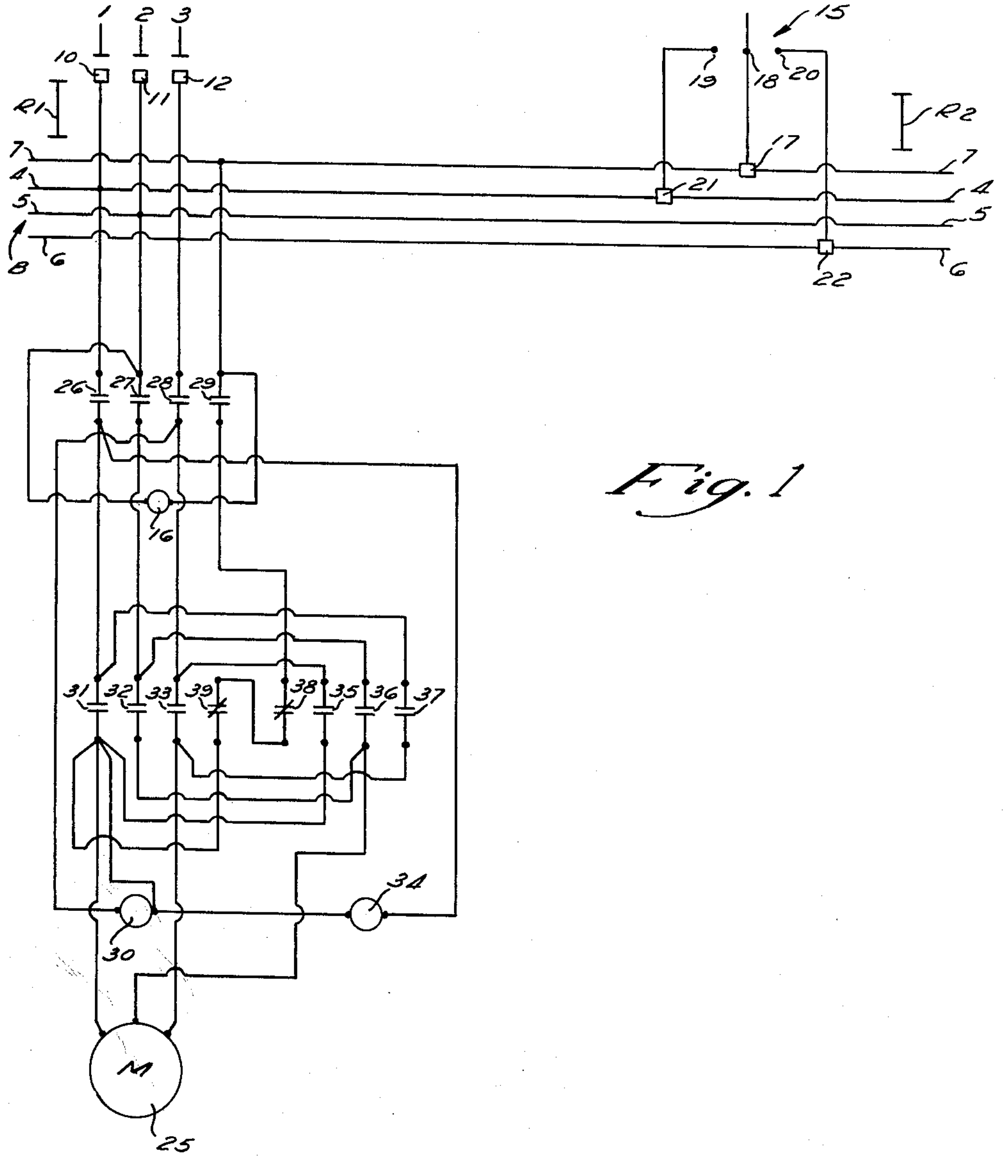
FIGURE 1 is a fragmentary diagrammatic wiring diagram for a traveling bridge crane embodying the present invention.

FIGURE 1 shows diagrammatically a combination of elements embodying the present invention and associated with a bridge crane B. R1 and R2 indicate parallel runways for the bridge crane. A three-phase power supply line includes conductors 1, 2 and 3. The crane bridge carries first, second and third power conductors in the form of bus bars 4, 5 and 6, respectively. A fourth control conductor or pilot conductor 7 is also carried by the crane in parallel arrangement with the lines 4, 5 and 6. Power collectors 10, 11 and 12 are connected, respectively, to bus bars 4, 5 and 6 on the crane and, respectively, engage the power lines 1, 2 and 3.

The crane also carries a motor circuit which connects bus bars 4, 5 and 6 with a three-phase alternating current motor 25 through main contacts 26, 27 and 28 and includes a forward contactor coil 30 and three normally open contacts 31, 32 and 33 which are actuated by the coil 30 to energize the motor in the forward direction and also a reverse contactor coil 34 and three normally open contacts 35, 36 and 37 which are actuated by said coil 34 to energize the motor in reverse.

The crane B carries a pilot circuit which connects the pilot bus bar 7 with either bus bar 4 or 6 through a switch 15 and a main contactor coil 16. The switch 15 includes a collector 17 engaging pilot bus bar 7 and a tongue connected to terminal 18 and engageable with either of terminals 19 and 20 which are connected, respectively, to collectors 21 and 22 which engage bus bars 4 and 6, respectively.

The crane also carries an auxiliary initiating circuit and a holding circuit. The initiating circuit includes a normally open main contact 29 connectable to the pilot circuit bar 7, and a set of normally closed auxiliary contacts 38 and 39 connected to the contactor coils 30 and 34 of the motor circuit. The forward holding circuit includes normally open contacts 26 and 31 and the reverse holding circuit includes contacts 28 and 35.

The switch 15 is normally spring biased into open position as is shown in FIG. 1. Assuming that this switch is moved to connect terminals 18 and 19, as is shown in FIG. 2, and that the contacts 26, 27, 28 and 29 are open, current supplied to bus bar 4 through power collector 10 from the power supply source line 1, will be collected by collector 21 of the pilot circuit, will flow through the switch 15 and to collector 17 which engages pilot bar 7, thence on through main coil 16 and finally to bus bar 5 which connects with power collector 11 connecting to power line 2.

When the pilot circuit is energized, coil 16 will close contacts 26, 27, 28 and 29. When contact 29 is closed current flowing through switch 15, as just described, will flow through normally closed contacts 38 and 39 and coil 30. Thus, coil 30 will be energized and will close holding contact 31 whereupon the motor circuit will be completed from bus bar 4 through pilot contact 26 and control contact 31 of the holding circuit to maintain coil 30 energized through pilot contact 28 to bar 6. When this circuit is so established, normally closed initiating contact 39 opens disconnecting the initiating circuit.

The motor will continue to run in the forward direction so long as the switch 15 connects terminals 18 and 19. When that switch is moved to disconnect terminals 18 and 19, coil 16 will be deenergized and contacts 26, 27, 28 and 29 will be opened, thereby breaking the motor power circuit and the control circuit and deenergizing the motor and control.

Figures 2, 3:
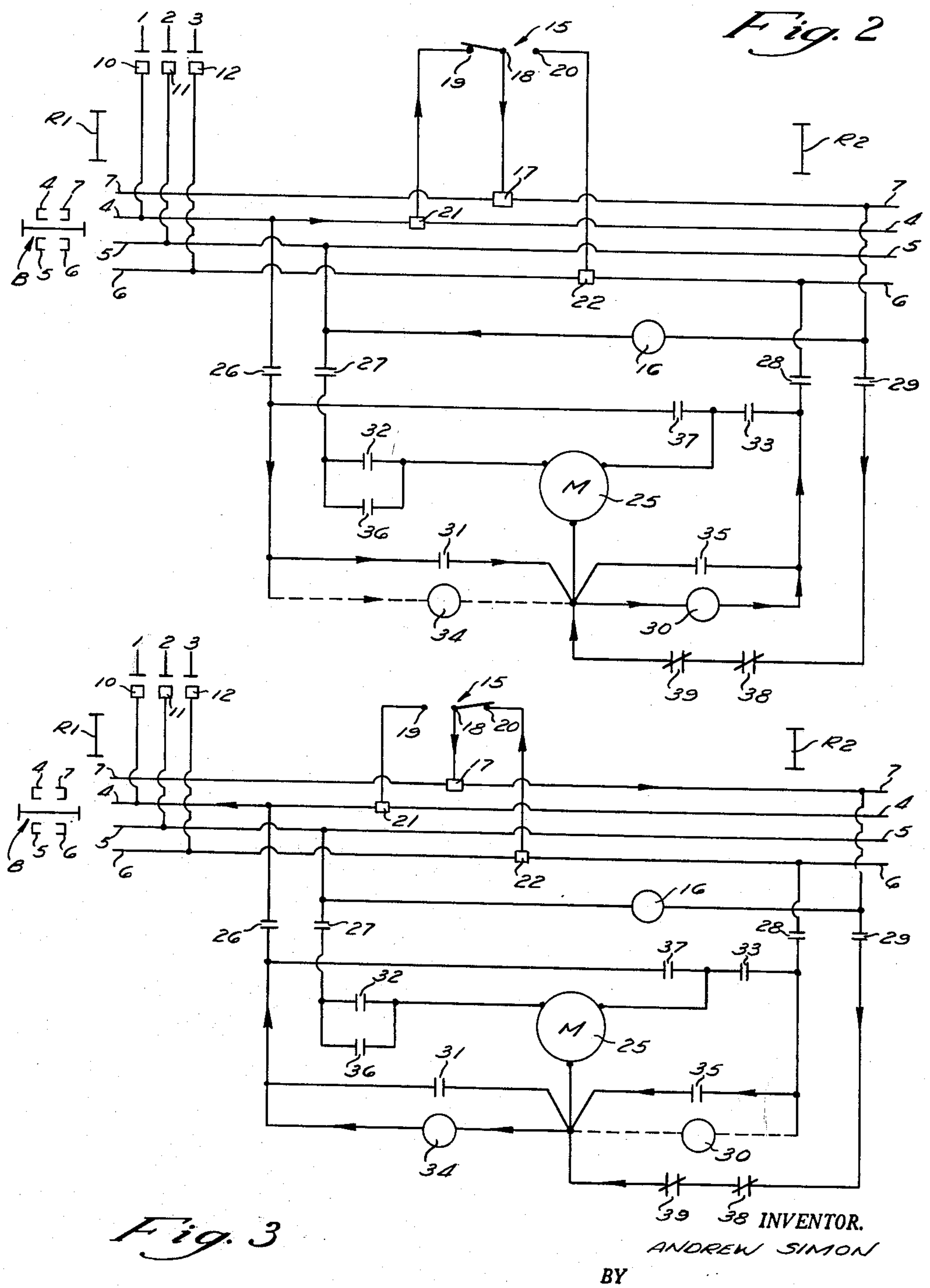
FIGURE 2 is an elementary wiring diagram of the system shown in FIGURE 1 in which is indicated the circuit in use when the motor is moving forward.
FIGURE 3 is a view corresponding to FIGURE 2 but in which is indicated the circuit in use when the motor is moving reverse.

In FIG. 3, the circuits are shown in the position in which the motor M is reversed. As appears from this figure, switch 15 makes contact with terminals 18 and 20. Current supplied to bus bar 6 through power collector 12 from the power supply source line 3 will be collected by collector 22 of the pilot circuit, will flow through switch 15 and to collector 17 engaging pilot bar 7, thence on through main coil 16 and finally to bus bar 5 which connects with power collector 11 to power line 2.

When the pilot circuit is energized, coil 16 will close contacts 26, 27, 28 and 29. Thereupon, current flowing through switch 15, as just described, will flow through the auxiliary initiating contact 29 and through normally closed contacts 38 and 39. When coil 16 is thus energized it also energizes coil 34 which closes contact 35 whereupon the motor circuit will be completed from bus bar 6 through pilot contact 28 and control contact 35 of the holding circuit to maintain coil 34 energized. When this circuit is so established, normally closed initiating contact 38 opens thereby disconnecting the initiating circuit. The motor will continue to run in reverse until switch 15 is opened whereupon contacts 26, 27, 28 and 29 will be opened.

It is to be understood that the present invention is not restricted to use with a bridge crane but that it may be used with a monorail system. It will be noted that in the illustrated embodiment of the invention, the motor circuit and the pilot circuit are relatively movable on the crane which carries both circuits. However, either of these circuits may be fixed while the other is movable.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The combination comprising:

(a) first, second and third power supply conductors and a fourth pilot control conductor adjacent said power supply conductors;

(b) a pilot control system including switch means having a FORWARD position connecting the pilot control conductor to the first supply conductor and a REVERSE position connecting the pilot conductor to the third supply conductor;

(c) a remote motor system including:

(1) a three phase motor and a motor circuit connecting each such phase to one of the three supply conductors;

(2) a MAIN contactor having a coil connected between the control conductor and the second supply conductor, said MAIN contactor including MAIN contacts in said motor circuit to render said motor normally disconnected from the supply conductors;

(3) a FORWARD contactor including normally open contacts and a coil for operating the contacts, the FORWARD contacts being connected in said motor circuit between the MAIN contacts and the motor, the FORWARD coil being connected between the motor side of the FORWARD contact in the portion of the motor circuit connected to said first supply conductor and the power supply side of the FORWARD contact in the portion of the motor circuit connected to said third supply conductor;

(4) a REVERSE contactor including normally open contacts and a coil for operating the contacts, the REVERSE contacts being connected to said motor circuit to reverse the power supply connections thereto, the REVERSE coil being connected between the motor side of the FORWARD contact in the portion of the motor circuit connected to said first supply conductor and the power supply side of the FORWARD contact in the portion of the motor circuit connected to said first supply conductor; and, (5) a pilot control circuit connected between said control conductor and the motor side of the FORWARD contact in the portion of the motor circuit connected to said first supply conductor, and both said FORWARD and REVERSE contactors including normally closed contacts in said pilot control circuit.

2. The combination comprising:

(a) first, second and third power supply conductors and a fourth pilot control conductor running parallel to said power supply conductors;

(b) a pilot control system including switch means having a FORWARD position connecting the pilot control conductor to the first supply conductor and a REVERSE position connecting the pilot conductor to the third supply conducotr;

(c) a remote motor system including:

(1) a three-phase motor and a motor circuit connecting each such phase to one of the three supply conductors;

(2) a MAIN contactor having a coil connected between the control conductor and the second supply conductor, said MAIN contactor including MAIN contacts in said motor circuit to render said motor normally disconnected from the supply conductors;

(3) a FORWARD contactor including normally open contacts and a coil for operating the contacts, the FORWARD contacts being in said motor circuit between the MAIN contacts and the motor, the FORWARD coil being connected between the motor side of the FORWARD contact in the portion of the motor circuit connected to said first supply conductor and the power supply side of the FORWARD contact in the portion of the motor circuit connected to said third supply contactor;

(4) a REVERSE contactor including normally open contacts and a coil for operating the contacts, the REVERSE contacts being connected to said motor circuit to reverse the power supply connections thereto, the REVERSE coil being connected between the motor side of the FORWARD contact in the portion of the motor circuit connected to said first supply conductor and the power supply side of the FORWARD contact in the portion of the motor circuit connected to said first supply conductor;

(5) a pilot control circuit connected between said control conductor and the motor side of the FORWARD contact in the portion of the motor circuit connected to said first supply conductor, and both said FORWARD and REVERSE contactors including a normally closed contact in said pilot control circuit; and, (d) at least one of said systems being connected to the specified ones of the four parallel conductors by collectors and being movable longitudinally relative to the conductors.

3. The combination of:

(a) a crane runway;

(b) a bridge crane unit mobile on said runway;

(c) a three phase bridge crane motor secured to said bridge crane;

(d) a bridge crane controller unit movable on said bridge crane;

(e) first, second and third power supply conductors and a fourth control conductor carried on said bridge crane parallel to the travel of the controller unit;

(f) said controller unit including a pilot control switch connected to said first and third supply conductors and said control conductors by collectors, said pilot control switch having a FORWARD position connecting the pilot control conductor to the first supply conductor and a REVERSE position connecting the pilot conductor to the third supply conductor;

(g) a motor circuit connecting said crane motor to said supply and control conductors, said motor circuit including:

(1) a MAIN contactor having a coil connected between the control conductor and the second supply conductor, said MAIN contactor including MAIN contacts in said motor circuit to render said motor normally disconnected from the supply conductors;

(2) a FORWARD contactor including normally open contacts and a coil for operating the contacts, the FORWARD contacts being in said motor circuit between the MAIN contacts and the motor, the FORWARD coil being connected between the motor side of the FORWARD contact in the portion of the motor circuit connected to said first supply conductor and the power supply side of the FORWARD contact in the portion of the motor circuit connected to said third supply conductor;

(3) a REVERSE contactor including normally open contacts and a coil for operating the contacts, the REVERSE contacts being connected to said motor circuit to reverse the power supply thereto, the REVERSE coil being connected between the motor side of the FORWARD contact in the portion of the motor circuit connected to said first supply conductor and the power supply side of the FORWARD contact in the portion of the motor circuit connected to said first supply conductor; and, (4) a pilot control circuit connected between said control conductor and the motor side of the FORWARD contact in the portion of the motor circuit connected to said first supply conductor, and both said FORWARD and REVERSE contactors including normally closed contacts in said pilot control circuit.

4. The combination comprising:

(*a*) a motor system interconnected with a remote pilot control system by a plurality of power supply conductors and a pilot control conductor extending parallel to said power supply conductors;

(*b*) said pilot control system including switch means having a FORWARD position connecting the pilot control conductor to a first of said supply conductors and a REVERSE position connecting the pilot control conductor to a second of said supply conductors;

(*c*) said motor system including:

(i) a motor circuit;

(ii) normally open FORWARD contacts connected to said motor circuit and to said supply conductors for energizing said motor circuit for operation in a forward direction when the FORWARD contacts are closed;

(iii) normally open REVERSE contacts connected to said motor circuit and to said supply conductors for reversing the motor connections for operation in a reverse direction when said REVERSE contacts are closed;

(iv) FORWARD and REVERSE contactor coils for closing said normally open FORWARD and REVERSE contacts when energized respectively, said REVERSE contactor coil having one side connected to said first supply conductor and its other side connected to said second supply conductor via one of the normally open REVERSE contacts, said FORWARD contactor coil having one side connected to said second supply conductor and its other side connected to said first supply conductor via one of the normally open FORWARD contacts;

(v) normally closed FORWARD and REVERSE contacts connected in series between the other sides of both said FORWARD and REVERSE contactor coils and said pilot control conductor, said FORWARD and REVERSE contactor coils opening said normally closed FORWARD and REVERSE contacts when energized respectively; and, (*d*) at least one of said systems being connected by collectors to the conductors and being movable longitudinally relative to said conductors.

5. The combination comprising:

(*a*) first, second, and third power supply conductors and a pilot control fourth conductor extending adjacent said power supply conductors;

(*b*) a pilot control system including switch means having a FORWARD position connecting the pilot control conductor to the first supply conductor and a REVERSE position connecting the pilot control conductor to the third supply conductor;

(*c*) a motor system comprising:

(1) a motor circuit;

(2) contact means having a first position connecting said motor circuit to the power supply conductors for operating said motor circuit in a forward direction and a second position connecting said motor circuit to said power supply conductors for operating said motor circuit in a reverse direction;

(3) FORWARD and REVERSE contactor coils for operating said contact means to said first and second positions respectively when energized;

(4) first circuit means connecting said FORWARD and REVERSE contactor coils to said supply conductors for energizing said FORWARD and REVERSE contactor coils when said switch means is in its FORWARD and REVERSE positions respectively;

(5) normally open MAIN contacts in said first circuit means between one side of said REVERSE contactor coil and said first supply conductor and between one side of said FORWARD contactor coil and said third supply conductor;

(6) a first line connecting the pilot control conductor to said second supply conductor;

(7) a MAIN contactor coil in said first line and operating said MAIN contacts to a closed position when energized;

(8) a second line connecting the pilot control conductor to the other sides of both said FORWARD and REVERSE contactor coils;

(9) normally closed FORWARD and REVERSE contacts in said second line and being operated to open positions when said FORWARD and REVERSE coils are energized respectively; and,

(10) second circuit means connected to said FORWARD and REVERSE contactor coils and to said contact means for maintaining said FORWARD and REVERSE contactor coils energized when said normally closed FORWARD and REVERSE contacts are operated to open positions respectively.

6. The combination of claim 5 including, in combination:

(*d*) at least one of said systems being connected by collectors to the specified ones of the four conductors and being movable longitudinally relative to said conductors.

7. The combination comprising:

(*a*) first, second, and third power supply conductors and a pilot control fourth conductor extending adjacent said power supply conductors;

(*b*) a pilot control system including switch means having a FORWARD position connecting the pilot control conductor to the first supply conductor and a REVERSE position connecting the pilot control conductor to the third supply conductor;

(*c*) a motor system including:

(1) a motor circuit;

(2) normally open FORWARD contacts connecting said motor circuit to each of said supply conductors for energizing said motor circuit for operation in a FORWARD direction when the FORWARD contacts are closed;

(3) normally open REVERSE contacts connected to said motor circuit and to said supply conductors for reversing the motor connections for operation in a reverse direction when said REVERSE contacts are closed;

(4) FORWARD and REVERSE contactor coils for closing said normally open FORWARD and REVERSE contacts when energized respectively, said REVERSE contactor coil having one side connected to said first supply conductor and its other side connected to said third supply conductor via a normally open REVERSE contact, said FORWARD contactor coil having one side connected to said third supply conductor and its other side connected to said first supply conductor via a normally open FORWARD contact;

(5) a first line connecting a pilot control conductor to the other sides of both said FORWARD and REVERSE contactor coils;

(6) normally closed FORWARD and REVERSE contacts connected in series in said first line and being opened when said FORWARD and REVERSE contactor coils are energized respectively;

(7) a plurality of normally open MAIN contacts interposed between said power supply conductors and said FORWARD and REVERSE contacts;

(8) a second line connecting the pilot control conductor to said second power conductor; and, (9) a MAIN contactor coil in said second line and operating said MAIN contacts to a closed position when energized.

8. The combination of claim 7, including:

(10) an additional normally open MAIN contact connected in series in said first line between said pilot control conductor and said normally closed FORWARD and REVERSE contacts.

9. The combination of claim 7 including, in combination:

(*d*) at least one of said systems being connected by collectors to the specified ones of the four conductors and being movable longitudinally relative to said conductors.

References Cited by the Examiner

UNITED STATES PATENTS

| | | | |
|---|---|---|---|
| 1,320,074 | 10/19 | Lum | 318—520 |
| 1,708,887 | 4/29 | Jackson | 318—208 |
| 1,879,176 | 9/32 | Gast | 318—289 |

ORIS L. RADER, *Primary Examiner.*

MILTON O. HIRSHFIELD, *Examiner.*

UNITED STATES PATENT OFFICE
CERTIFICATE OF CORRECTION

Patent No. 3,181,047 April 27, 1965

Andrew Simon

It is hereby certified that error appears in the above numbered patent requiring correction and that the said Letters Patent should read as corrected below.

Column 3, line 66, for "conducotr" read -- conductor --; column 4, line 13, for "contactor" read -- conductor --.

Signed and sealed this 21st day of September 1965.

(SEAL)
Attest:

ERNEST W. SWIDER
Attesting Officer

EDWARD J. BRENNER
Commissioner of Patents